May 22, 1934.  E. W. PAXTON  1,959,545
METHOD OF AND APPARATUS FOR SEVERING WIRE GLASS
Filed Feb. 3, 1931  5 Sheets-Sheet 1
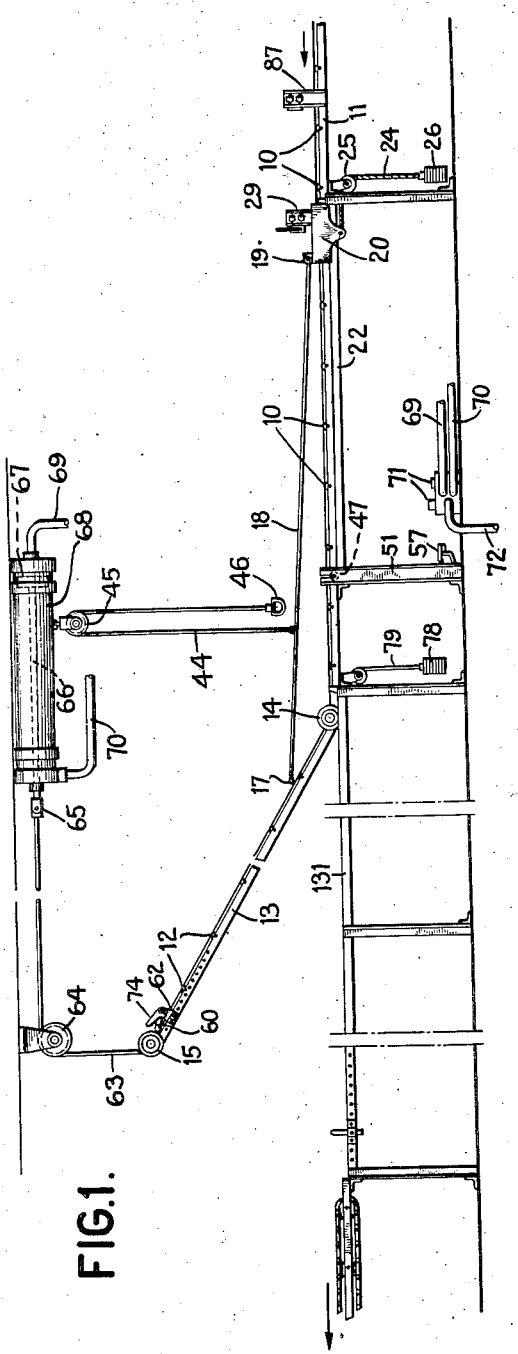
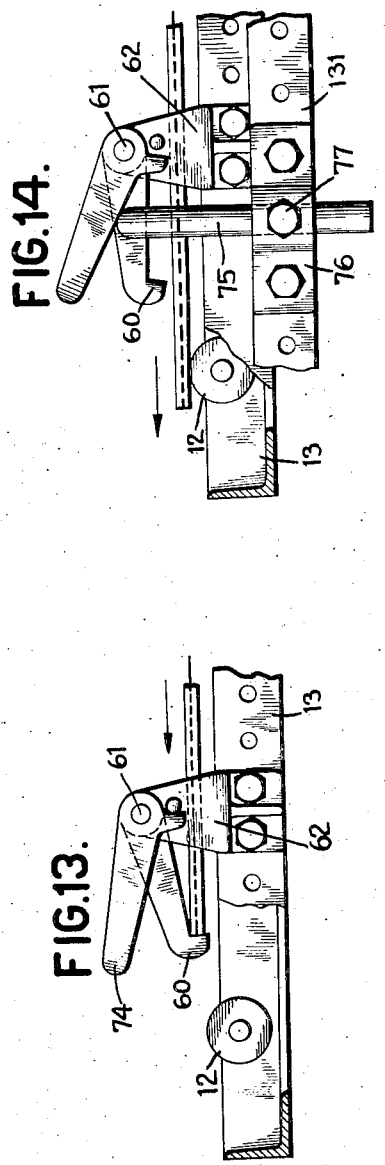
INVENTOR
Elisha W. Paxton
BY his ATTORNEY

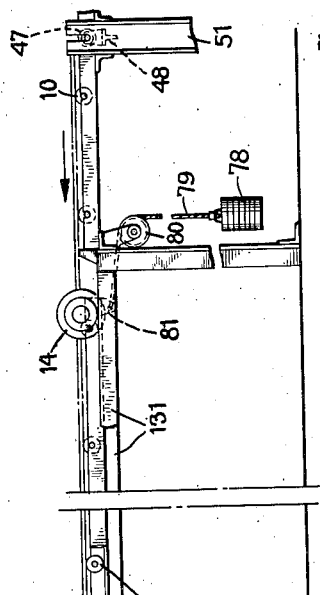

May 22, 1934.     E. W. PAXTON     1,959,545
METHOD OF AND APPARATUS FOR SEVERING WIRE GLASS
Filed Feb. 3, 1931     5 Sheets-Sheet 3
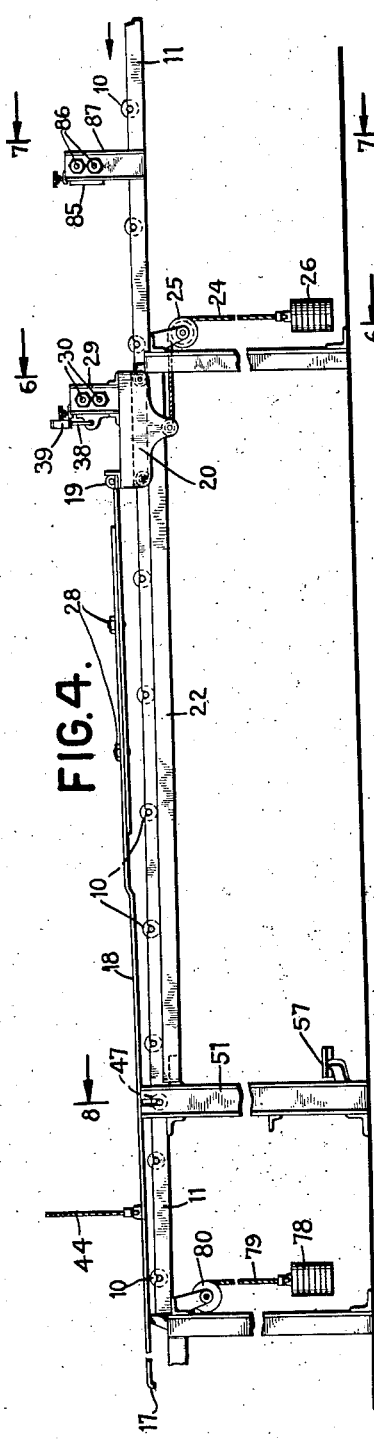
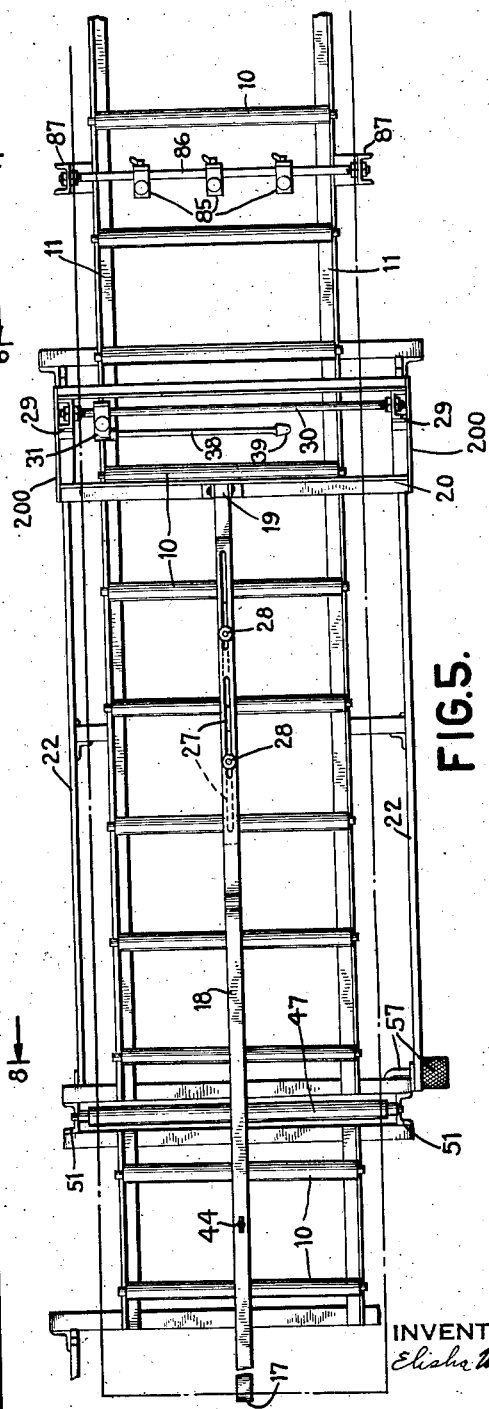
INVENTOR
Elisha W. Paxton
BY his ATTORNEY
H. C. Diesem May 22, 1934. E. W. PAXTON 1,959,545
METHOD OF AND APPARATUS FOR SEVERING WIRE GLASS
Filed Feb. 3, 1931 5 Sheets-Sheet 4
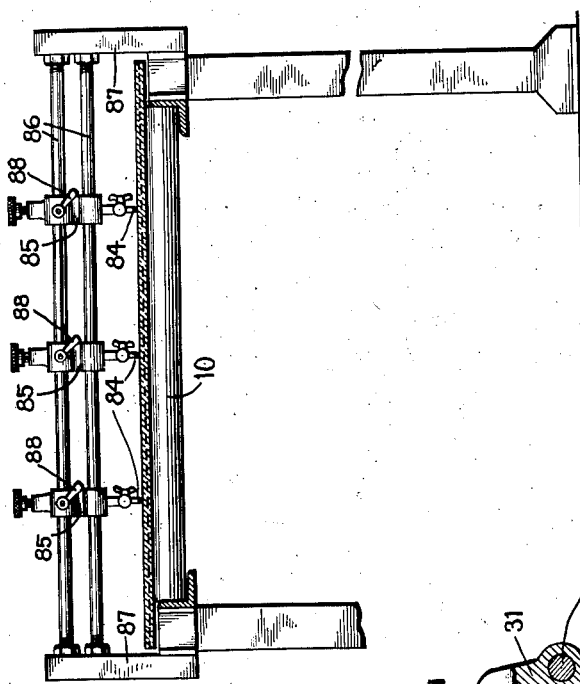
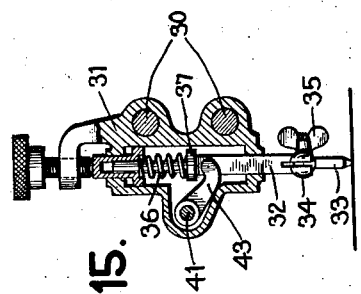
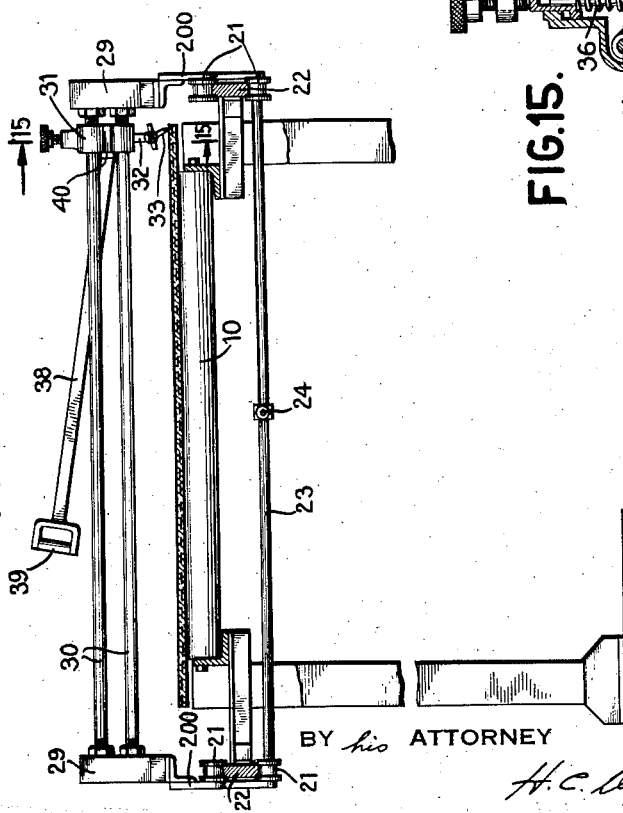
INVENTOR
Elisha W. Paxton
BY his ATTORNEY May 22, 1934.   E. W. PAXTON   1,959,545
METHOD OF AND APPARATUS FOR SEVERING WIRE GLASS
Filed Feb. 3, 1931   5 Sheets-Sheet 5
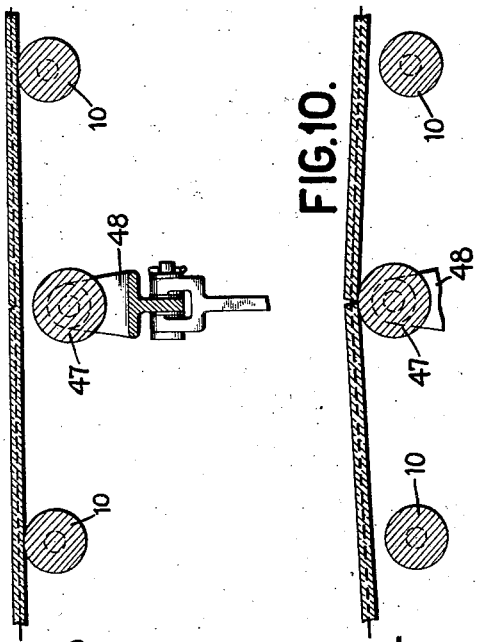
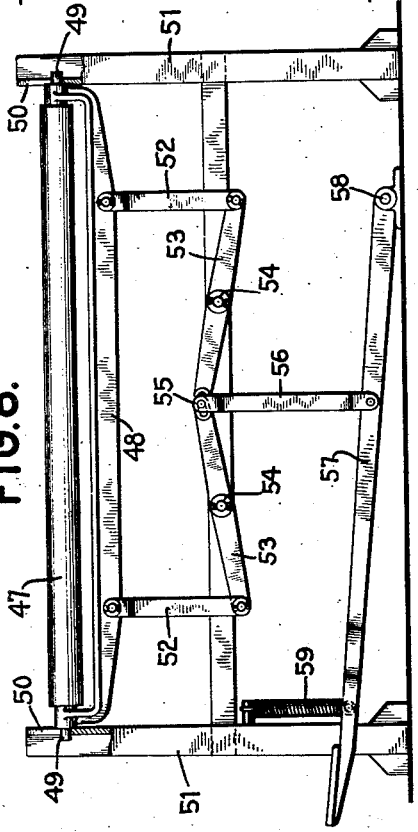
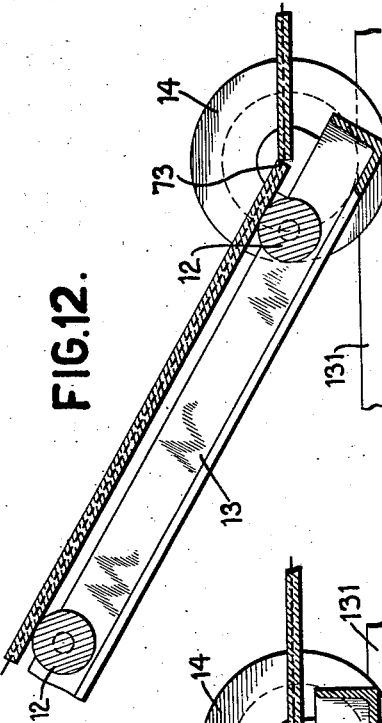
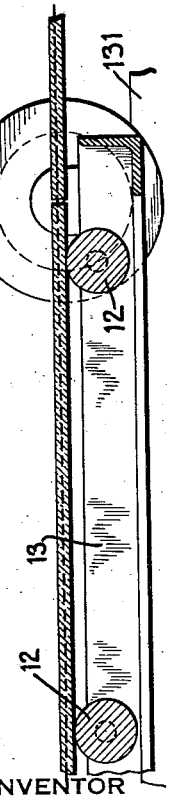
INVENTOR
Elisha W. Paxton
BY his ATTORNEY
H. C. Chesnut

UNITED STATES PATENT OFFICE 1,959,545

METHOD OF AND APPARATUS FOR SEVERING WIRE GLASS

Elisha W. Paxton, Washington, Pa., assignor, by mesne assignments, to Mississippi Glass Company, New York, N. Y., a corporation of New York Application February 3, 1931, Serial No. 513,078

13 Claims. (Cl. 49—48)

This invention relates to methods of and means for severing strips of wire glass, produced in a continuous manner by wire glass making equipment, into sheets of desired length for storage or shipment.

It has been an object of the invention to provide simple but effective means for severing a continuous strip of wire glass while it is in motion in the course of its continuous production. Severing of wire glass necessitates not only the breaking of the glass along desired lines but severing of the wires of the netting embedded in the glass as well. Prior methods of severing wire glass have involved the sacrifice of a section of the glass of say eight inches or so in length and extending across the entire width of the strip. Where the glass is being cut into lengths of 10 to 12 feet a loss of between 5 and 7% of the output of the glass forming equipment is encountered in the older cutting methods. According to the present invention the wire glass continuously produced by the rolling or forming equipment is severed without loss of any portion of the output and the cutting or breaking operation is carried out while the continuous strip delivered from the annealing lehr is in motion.

In the form of the invention illustrated the several operative parts of the equipment are adapted to be controlled by a single operator suitably stationed at a point where proper inspection of the glass at various stages may be made. The control of the equipment may be made automatic if desired.

Other objects and advantages of the invention will appear from the detailed description of an illustrative form of the same which will now be given in conjunction with the accompanying drawings in which:

Figure 1 is a side elevation of the illustrative apparatus embodying the features of the present invention.

Figure 2 is a side elevation on a larger scale of a traveling rack portion of the apparatus.

Figure 3 is a plan view of the apparatus shown in Figure 2.

Figure 4 is a side elevation of the glass marking and cutting portion of the apparatus.

Figure 5 is a plan view of the apparatus shown in Figure 4.

Figure 6 is a transverse sectional view taken along the line 6—6 of Figure 4.

Figure 7 is a transverse sectional view taken along the line 7—7 of Figure 4.

Figure 8 is a transverse sectional view showing the glass breaking roll and is taken along the line 8—8 of Figure 4.

Figure 9 is an enlarged longitudinal sectional view taken through the glass breaking roll.

Figure 10 is a view similar to Figure 9 with the roll shown in an elevated position.

Figure 11 is an enlarged detail view in section showing the fulcrum end of the traveling rack.

Figure 12 is a view similar to Figure 11 with the rack shown in inclined position.

Figure 13 is a detail view partly in section of certain stop elements carried by the traveling rack.

Figure 14 is a view similar to Figure 13 showing the stop elements in a shifted position and in cooperation with a fixed stop, and Figure 15 is a detailed, sectional view of a marking head employed in the apparatus.

Briefly the method of severing the wire glass which is contemplated by the present invention involves placing a series of cross lines in the upper surface of the glass at intervals of 10 or 12 feet, as desired, as the glass is passed along a suitable conveyor which may be a continuation of the live rolls of the annealing lehr. As the cross cuts or lines in the sheet of glass pass over a suitable breaking roll or edge the latter is raised sufficiently to cause the glass to snap at the cross line. The wires of the netting embedded in the glass are still unaffected, however, and these must be subsequently broken. For this purpose the invention contemplates the provision of a traveling carriage onto which the glass is fed by the conveyor rolls. After an appropriate length of glass has been fed onto this carriage it is moved along at the rate of feed of the glass, so that no further relative movement between the two will take place, and the forward end of the carriage is simultaneously lifted. The adjustment and control of the various portions of the apparatus will be such that the breaks in the glass, previously made, will lie at the fulcrum about which the forward end of the carriage is raised. This places a considerable tension upon the wires at the line of breakage of the glass, at which they are being bent, and they are accordingly snapped at this point. The end of the carriage is then lowered and the glass is fed from its surface and the carriage returned longitudinally to perform the same operation on the next section of glass.

Referring now to the drawings, wire glass as it is continuously produced by suitable forming equipment may be conveyed in the usual way through an annealing lehr provided with suitable live rollers for continuously feeding the glass forwardly. Upon leaving the annealing lehr the glass may be delivered to conveyor rollers 10 carried by suitable side supports or frames 11 mounted at a suitable elevation above the ground on standards formed by channel members or the like. As a continuation of the conveyor rollers 10 there may be provided similar rollers 12 carried by suitable side members 13 of a frame which is mounted at its opposite ends on wheels or rollers 14 and 15 adapted to roll along tracks 131 provided at the sides of the frame. An intermediate frame member 16 may be provided between the side members 13 for lending additional support to the rollers 12. There is thus formed a traveling rack or carriage which is adapted to be shifted longitudinally along the tracks 131.

As the glass is fed over the rollers 10 and 12 it is brought into contact with the forward, downwardly extending end 17 of a hook member 18 pivotally supported at 19 on a traveling carriage 20. The latter, as best shown in Figure 6, comprises two side plates 200 each carrying a plurality of rollers 21 adapted to roll along suitable guide rails 22. Any appropriate means may be provided for normally maintaining the carriage in its extreme righthand position, as shown in Figure 1, and for restoring the carriage to this position after it has been shifted. For this purpose there may be suitably provided a cross rod 23 extending between the lower portions of the side plates 200 and having connected at its midpoint a flexible element such as a rope or cord 24 which passes over a pulley 25 and carries at its free end a weight 26. It will be apparent that as the glass is fed along the rollers 10 and 12 and is brought into engagement with the hook 17, the continued motion of the glass will be imparted to the carriage 20. Movement of the latter will in turn cause the weight 26 to be lifted. In order that the position of the hook 17 with respect to the carriage may be varied for the purpose of varying the length of the sheets of glass to be cut by the apparatus in the manner to be explained, the member 18 is formed in two sections. Each section may be suitably provided with an elongated slot 27 and the two members may be suitably joined, in any relative position permitted by the slots, by means of a pair of bolts 28, or the like, passing through the slots.

Any suitable devices may be carried by the traveling carriage 20 for the purpose of producing a straight line across the glass as the carriage and glass are shifted at the same rate of speed. For this purpose the side plates 200 of the carriage may have integral therewith, or otherwise secured thereto, vertical side supports 29 adapted to receive the opposite ends of a pair of rods 30. A cutting or marking head 31 may be suitably supported by the rods 30 and adapted to be moved longitudinally along the rods. Within the head there is preferably provided a vertically extending rod 32 adapted to support at its lower end a diamond or other glass-cutting tool 33. This tool is preferably connected to the lower end of the rod by means of a ball and socket connection 34 so that the tool may be adjusted angularly in any direction. Any suitable means, such as a wing-nut 35, may be provided for clamping the tool in a desired position. Within the head 31 there may be provided a spring 36 cooperating at its upper end with an adjustable sleeve and at its lower end with a collar 37 carried by the rod 32. In this way the tool 33 is yieldingly urged by the spring against the surface of the glass. For the purpose of drawing the cutting tool across the surface of the glass to produce a transverse mark or cut in the surface, a handle 38 provided with any suitable form of grip 39 may be secured to the head 31. The method of attachment of the handle 38 to the head is preferably such that the latter may not only be drawn along the guide rods 30 but the handle may be rotated to lift the cutting tool from the surface of the glass to permit the head to be returned to its initial position while the tool is out of contact with the glass. For this purpose the handle may be pivotally connected at 40 to a shaft or stud 41 journalled in the casing of the head 31. Within the casing the shaft may be provided with a cam or an arm 43 adapted to cooperate with the collar 37 carried by the rod 32. In the normal position of the handle 38, as shown in Figure 6, the cam or arm 43 will be below the collar 37 and spaced therefrom sufficiently to permit the free action of the spring 36 in forcing the tool against the glass. However, when the handle 38 is rotated slightly, the arm 43 will engage the collar 37 and lift the rod 32 to disengage the tool from the surface of the glass.

After the cutter head 31 has been drawn across the glass and is then returned to its initial position, the hook 17 may be raised out of contact with the end of the glass so as to permit the carriage 20 to be returned to its normal position by the weight 26 preparatory to the marking of the next length of glass. For the purpose of lifting the hook 17, the member 18 may have attached at a suitable point a rope or cord 44 which extends around an overhead pulley 45 and terminates, at a point above the machine, in a handle 46. The same operator who has drawn the head 31 across the glass may, upon completion of the marking operation, operate the cord 44 to lift the hook from the end of the glass. As the sheet of glass continues its advance along the rollers 10 and 12, the transverse mark or cut formed in its surface will be brought above a breaking roller 47. The latter is normally supported in a position below the glass and is adapted to be lifted, by the mechanism to be presently described, at the appropriate time to cause the glass to be broken. The roller 47 for this purpose may be carried by a supporting bracket 48. The trunnions 49 of the roller which extend through the bearings provided at the ends of the bracket 48 may extend also into vertical slots 50 formed in suitable supporting standards 51. Adjacent the opposite ends of the bracket 48 there may be pivotally connected to the same, downwardly extending links 52 which are in turn pivotally connected to the ends of levers 53 fulcrumed about fixed, intermediate pivots 54 carried by a portion of the frame of the machine. These levers are connected at their inner ends 55 to a downwardly extending link 56. The connection between the levers 53 and the link 56 will preferably be through elongated slots formed in the levers cooperating with a pin carried by the link so that the necessary relative movements may be obtained. At its lower end the link 56 may be attached to a foot treadle or lever 57 carried by a fixed pivot 58 and having a spring 59 connected thereto adjacent its forward end to normally elevate this end of the lever. In the normal position of the parts, as shown in Figures 8 and 9, the roller 47 will be below the under-surface of the glass. However, when the foot treadle or lever 57 is depressed, the links 52, and hence the roller 47, will be raised into the position indicated in Figure 10. Due to the brittleness of the glass it will be snapped along the line or cut formed in its upper surface by the tool 33 and the two sections of the glass will then be joined simply by the wires of the netting embedded in the same. The roller 47 is preferably raised at the time the transverse line or cut is passing directly over it, although the glass may be readily broken if the roller is raised when the transverse cut is within 6" or 8" of the vertical axis of the roller. It is preferable not to raise the roller until the cut has reached the roller and possibly passed beyond the same a slight distance. However, due to the fact that the wire netting still holds the sections of the glass together, even after the glass itself is severed, it is possible, without damage to the glass or the equipment, to lift the roller and sever the glass before the cut reaches the vertical axis of the roller.

As the sheet of glass is advanced along the rollers 10 and 12, it finally abuts against a shoulder carried by a detent or stop 60 which is secured to a shaft or rod 61 supported by brackets 62 secured to the side frames 13 of the traveling table. At the forward end of the table there is attached a rod or cord, or similar flexible member, 63, which is led over a pulley 64 supported above the machine. The free end of the cord is attached at 65 to the rod 66 of a piston 67 mounted within an air cylinder 68. Air may be admitted to either end of the cylinder by means of lines 69 and 70. By the introduction of compressed air from any suitable source to either side of the piston 67, movement of the same in a desired direction may be effected. If the piston is shifted toward the right, as shown in Figure 1, the forward end of the table will be raised to a considerable extent so that the upper surface of the table will be tilted at an angle of say between 30° and 45°. If air is now introduced into the opposite side of the cylinder through the line 69, the table will be lowered into a horizontal position. By suitably retarding the discharge of the air from the inactive side of the cylinder, the speed with which the table is raised and lowered may be readily controlled. If desired a counter-weight may be associated with the table so as to substantially balance the load which it applies to the cord 63 when the table is raised. In this way the work required to be performed by the air cylinder may be reduced to a minimum and a smaller cylinder or lower pressure or both may be employed.

Any suitable means may be provided for controlling the introduction of air from a comtpressor or other suitable source of supply to the opposite ends of the cylinder 68. For example, the air lines 69 and 70 may lead to a control box having a pair of foot-controlled plungers 71. Depression of one or the other of these plungers may serve to connect a source of supply of the compressed air associated with a line 72 with the desired one of the lines 69 and 70. The construction of this control system may be such that the line 69 or 70, which is not in communication with the source of compressed air, will be placed in communication with the atmosphere to permit a discharge of air from the opposite side of the cylinder.

The position of the stop 60 with reference to the pivot of the wheels 14 about which the table is tilted, in the manner explained, should be adjustable to accommodate different lengths of sheet and for this purpose the side frames 13 may either be provided with elongated slots or series of spaced holes to receive the securing bolts for the brackets 62. The location of the stop should be such that when it is engaged by the end of the sheet of glass, the transverse cut or break in the glass will be presented directly in line with the axis of the wheels 14, as shown in Figure 11. This may be done by adjusting the stop 60 to place it at the same distance from the axis of the wheels 14 as that between the hook 17 and the cutting edge of the tool 33. Now, when the forward end of the table is lifted into the position shown in Figure 12, the stress applied to the wire embedded in the sheet of glass at the point 73, where the glass is severed, will be so great as to snap or sever the wires across the entire width of the glass.

After the sheet of glass has abutted the stop 60, the continued movement of the glass will cause it to shift the table on its rollers 14 and 15 along the tracks 131. During the elevation of the forward end of the table in the manner previously explained, the table will be slid along the tracks 131 simply on the rear rollers 14. After the wires have been snapped by this tilting or deflection of the table, the latter is restored to its horizontal position but at a point advanced somewhat from its original position. This advance will have been sufficient to carry an arm 74, which is secured to the stop shaft 61, above a pin 75. Engagement of the arm 74 with the upper end of the pin will cause the shaft 61 to be rocked so that the stop 60 will be removed from the path of the sheet of glass. Preferably, the pin 75 should be made adjustable with respect to its distance from the normal or initial position of the traveling table so that it will function properly in conjunction with the stop 60 for whatever length of sheet the latter may be set. The pin may also be made adjustable as to height so as to insure operation of the arm 74 under all conditions. It may be suitably carried by a bracket 76, in which it may be adjustably held by means of a set-screw 77. Adjustment as to distance from the initial position of the table may be effected either by the provision of a number of brackets 76 at suitably spaced intervals or by the variable connection of a single bracket to the fixed frame work of the apparatus.

When the stop is disengaged from the end of the glass in the manner explained, the table is free to be returned to its initial position relative to the glass. For the purpose of restoring the table, a weight 78 may be provided, this being connected by a cord or rope 79, which is passed over a pulley 80, to a bracket 81 or similar portion of the traveling table. The sheet of glass continues to advance over the surface of the rollers 12 while the stop 60 merely slides along the upper surface of the glass. When the forward end of the sheet reaches the first of a series of rollers 82, it is adapted to be fed at a greater speed than it is normally fed and is thus rapidly carried away from the cutting apparatus. The rollers 82 for thus quickly disposing of the severed sheets of glass may be driven in any suitable way, as by means of a chain 83 cooperating with sprockets carried by the rollers and driven by any suitable power means, such as an electric motor. A new section of glass, which has by this time advanced partly onto the table, will engage the hook 17 and advance the carriage 20 so that the glass may again be marked with a transverse line by the cutter 33. Subsequently the new end of the glass will be brought up against the stop 60 to permit the operation of the breaking rack or table to be repeated. All of the manual controls, including the cutter handle 38, the hook release handle 46, the air-cylinder, foot controls 71 and the breaking-roll, foot treadle 57, may be operated by a single man suitably stationed adjacent these controls.

If desired the glass may be provided with a series of longitudinal cuts or marks as it is fed along the rollers 10. For this purpose there may be provided a series of cutting or marking tools 84 similar to the tool 33. These tools may be yieldably mounted in heads 85 adapted to be shifted to any desired position along a pair of guide rods 86 supported at their ends by side frames 87. Any suitable clamping means controlled by handles 88 may be provided for retaining the heads 85 in adjusted position.

While one admirable form of the invention has been disclosed in considerable detail, it is to be understood that this disclosure is for the purpose of illustration only and that numerous changes may be made in the construction and arrangement of the several parts without departing from the general spirit and scope of the invention. In lieu of the air cylinder 68, for example, for elevating the forward end of the traveling table, an electric motor may be provided, if desired, and this may be connected through suitable pulleys and cords to the end of the table to cause it to be lifted under the control of a suitable clutch. Provisions may be included, if desired, for the automatic release of the clutch when the table has been lifted to a sufficient extent so that it may be returned by its own weight, retarded if necessary by a counter weight. Numerous other changes may occur to those skilled in the art.

What I claim is:

1. Apparatus of the class described which comprises means for drawing a line across a sheet of wire glass, means for snapping the glass along said line, a traveling table adapted to receive the glass, and means for elevating one end of said table to sever the wires embedded in said glass.

2. Apparatus of the class described which comprises means for drawing a line across a continuously advancing sheet of wire glass, means for snapping the glass along said line, a table adapted to receive the glass, means for causing said table and glass to shift in unison when the glass reaches a definite point on said table, and means for elevating one end of said table to sever the wire embedded in said glass.

3. Apparatus of the class described which comprises means for drawing a line across a continuously advancing sheet of wire glass, said means comprising a traveling carriage adapted to advance with said glass and a cutter mounted for movement transversely of the carriage, means for snapping the glass along said line, a table adapted to receive the glass, means for causing said table and glass to shift in unison when the glass reaches a definite point on said table, and means for elevating one end of said table to sever the wire embedded in said glass.

4. Apparatus for severing a continuously advancing sheet of wire glass which comprises means including a carriage advancing in unison with said glass for scoring the glass along a straight line and means advanced at times by said glass for subsequently bending one section of the same relative to another along said line to sever the wires embedded in said glass.

5. Apparatus for severing a continuously advancing sheet of wire glass which comprises means for severing the glass along a line, a table for receiving said glass as it is advanced, an abutment on said table adapted to be engaged by said glass to cause movement of said glass and table in unison, and means for deflecting one end of said table about a point adjacent the line of severance of the glass as a fulcrum to break the wires embedded in the glass.

6. Apparatus for severing a continuously advancing sheet of wire glass which comprises means for severing the glass along a line, a table for receiving said glass as it is advanced, an abutment on said table adapted to be engaged by said glass to cause movement of said glass and table in unison, means for deflecting one end of said table about a point adjacent the line of severance of the glass as a fulcrum to break the wires embedded in the glass and to then restore said table to its normal plane, and means for displacing said abutment to permit relative movement between said table and glass as the table is restored.

7. Apparatus for severing a continuously advancing sheet of wire glass which comprises means for severing the glass along a line, a table for receiving said glass as it is advanced, an abutment on said table adapted to be engaged by said glass to cause movement of said glass and table in unison, means for tilting said table as it is advanced about a fulcrum adjacent the line of severance of said glass to sever the wires embedded in the glass and for then returning said table to its normal plane, and means for disengaging said abutment from said glass upon the return of said table to permit relative movement between said table and glass.

8. In apparatus of the class described, a rockable table adapted to receive a sheet of wire glass, a stop on said table at a predetermined distance from the fulcrum of said table, means for cutting a line across said sheet at said distance from the end of the glass, and means for rocking said table when the end of the glass abuts said stop to sever the glass into sections.

9. In apparatus of the class described a rockable table adapted to receive a continuously advancing sheet of wire glass, a stop on said table at a predetermined distance from the fulcrum of said table, means for cutting a line across said sheet at said distance from the end of the glass and means for rocking said table when the end of the glass abuts said stop to sever the glass into sections, said table being shifted bodily as it is rocked.

10. Apparatus for severing a continuously advancing sheet of wire glass which comprises means for scoring the glass along the desired line of severance, a traveling and tiltable carriage adapted to receive the advancing sheet, and means for tilting the carriage when the score line on the sheet is adjacent the carriage fulcrum, said carriage being shifted in unison with the glass as it is tilted.

11. A method of severing a continuously advancing sheet of wire glass which comprises marking a line transversely across the surface of the same, feeding the sheet onto a slidable and tiltable member, tilting the member about a fulcrum adjacent the end at which the sheet is fed onto the member to an extent sufficient to stretch the longitudinal wires beyond their elastic limit and to bring about severance of the glass along said line, and sliding the member by means of the glass to maintain the fulcrum of the member substantially along the line on the glass as the elastic limit of the wires is being exceeded.

12. Apparatus of the class described which comprises means for drawing a line across a continuously advancing sheet of wire glass to demark a large commercial stock section from the main sheet, said stock section comprising the entire connected portion of the sheet in advance of said line, means for snapping the glass along said line, and means for subsequently bending the stock section of glass with relation to the main sheet, said last mentioned means providing uniform support for the stock section while the glass is being advanced and bent to sever the wires embedded therein.

13. Apparatus of the class described which comprises means for drawing a line across a continuously advancing sheet of wire glass to demark a large commercial stock section from the main sheet, said stock section comprising the entire connected portion of the sheet in advance of said line, means for uniformly supporting the glass as it is advanced, means for snapping the glass along said line, and means for subsequently bending the stock section of glass with relation to the main sheet while the stock section is uniformly supported and is being advanced, the bending causing the severance of the wires embedded in the glass.

ELISHA W. PAXTON.